US012771934B2

(12) United States Patent
He et al.

(10) Patent No.: US 12,771,934 B2
(45) Date of Patent: Oct. 20, 2026

(54) FOCUSING SYSTEM AND FOCUSING METHOD

(71) Applicant: SMARTSENS TECHNOLOGY (HK) CO., LIMITED, Kowloon OT (CN)

(72) Inventors: Jin He, Shanghai (CN); Chao Le, Shanghai (CN); Mingzhe Liu, Shanghai (CN); Mao Peng, Shanghai (CN)

(73) Assignee: SMARTSENS TECHNOLOGY (HK) CO., LIMITED, Kowloon OT (CN)

( * ) Notice: Subject to any disclaimer, the term of this patent is extended or adjusted under 35 U.S.C. 154(b) by 9 days.

(21) Appl. No.: 19/097,265

(22) Filed: Apr. 1, 2025

(65) Prior Publication Data

US 2026/0136095 A1 May 14, 2026

(30) Foreign Application Priority Data

Nov. 13, 2024 (CN) ......................... 202411620917.1
Nov. 13, 2024 (CN) ......................... 202411620953.8

(51) Int. Cl.

| | |
|---|---|
| ***H04N 23/67*** | (2023.01) |
| ***G06T 3/40*** | (2006.01) |
| ***G06T 7/20*** | (2017.01) |
| ***G06T 7/70*** | (2017.01) |
| ***G06V 10/25*** | (2022.01) |
| ***G06V 10/28*** | (2022.01) |

(52) U.S. Cl.

CPC ............. *H04N 23/672* (2023.01); *G06T 3/40* (2013.01); *G06T 7/20* (2013.01); *G06T 7/70* (2017.01); *G06V 10/25* (2022.01); *G06V 10/28* (2022.01); *H04N 23/675* (2023.01)

(58) Field of Classification Search

CPC ...... H04N 23/672; H04N 23/675; G06T 3/40; G06T 7/20; G06T 7/70; G06V 10/25; G06V 10/28

See application file for complete search history.

(56) References Cited

U.S. PATENT DOCUMENTS

2021/0073527 A1* 3/2021 Huang .................. H04L 61/103
2022/0148130 A1* 5/2022 Tang ...................... G06N 3/044
2022/0163665 A1* 5/2022 Badeau ............... G01S 15/8915

* cited by examiner

*Primary Examiner* — Mekonnen D Dagnew
(74) *Attorney, Agent, or Firm* — Brooks Kushman P.C.

(57) ABSTRACT

A focusing system which is applied to an image sensor integrated in a device system and includes a main control unit, an image processing unit, a digital processing unit, a storage unit and a protocol communication unit. The image processing unit, after obtaining an original image and a phase map corresponding to the original image, performs downsampling processing and data rearrangement processing on the original image to obtain a rearranged image. The digital processing unit infers the rearranged image through an artificial intelligence model to obtain a model processing result. The main control unit determines movement parameters of a focus motor according to the model processing result and the phase map, and determines control parameters based on the movement parameters, and the control parameters are sent to a driver unit of the device system through the protocol communication unit, to enable the focus motor to perform focusing.

20 Claims, 5 Drawing Sheets

FOCUSING SYSTEM AND FOCUSING METHOD

CROSS-REFERENCE TO RELATED APPLICATIONS

Pursuant to 35 U.S.C. § 119 and the Paris Convention, this application claims the benefit of Chinese Patent Applications No. 202411620953.8 and No. 202411620917.1 both filed on Nov. 13, 2024, the contents of which are incorporated herein by reference.

TECHNICAL FIELD

The present application relates to the field of image sensor technology, more particularly to a focusing system and a focusing method.

BACKGROUND

The statements provided herein are merely background information related to the present application, and do not necessarily constitute any prior arts. Currently, a typical process for autofocus of a device when the device is shooting usually requires a collaboration of an image sensor, the device's processor and a focus motor to complete. Each step in the autofocus process will introduce a delay, and an accumulation of these delays may cause the position of lens to no longer meet the latest requirements for focus clarity after the focus motor completes its movement. At this point, the autofocus process needs to be repeatedly executed, resulting in a longer time required to achieve focus clarity. Thus, how to achieve faster autofocus has become a problem that needs to be solved urgently.

SUMMARY

The present application provides a focusing system and a focusing method, which can improve the speed of autofocus.

In accordance with a first aspect of the present application, a focusing system is provided, which is applied to an image sensor, and the image sensor is integrated into a device system; the focusing system includes: a main control unit, an image processing unit, a digital processing unit, a storage unit and a protocol communication unit.

The image processing unit, after obtaining an original image and a phase map corresponding to the original image, is configured to perform downsampling processing and data rearrangement processing on the original image to obtain a rearranged image and store the rearranged image and the phase map in the storage unit.

The digital processing unit is configured to infer the rearranged image through an artificial intelligence model to obtain a model processing result and store the model processing result in the storage unit. The artificial intelligence model is stored in the storage unit after the focusing system is initialized, and the model processing result includes position information of each focus object and a confidence coefficient of the position information of each focus object. The position information is used to indicate the position of a corresponding focus object in the original image.

The main control unit is configured to determine movement parameters of a focus motor of the device system according to the model processing result and the phase map and store the movement parameters in the storage unit.

The main control unit is also configured to determine control parameters based on the movement parameters and send the control parameters to a driver unit of the device system through the protocol communication unit, to enable the driver unit to drive the focus motor to perform focusing.

In accordance with a second aspect of the present application, a focusing method is provided, which is applied to an image sensor, and the image sensor is integrated into a device system. The focusing system includes: a main control unit, an image processing unit, a digital processing unit, a storage unit and a protocol communication unit; the focusing method includes steps of:

- performing, by the image processing unit after obtaining an original image and a phase map corresponding to the original image, downsampling processing and data rearrangement processing on the original image to obtain a rearranged image, and storing the rearranged image and the phase map in the storage unit;
- inferring, by the digital processing unit, the rearranged image through an artificial intelligence model to obtain a model processing result, and storing the model processing result in the storage unit, wherein the artificial intelligence model is stored in the storage unit after the focusing system is initialized, and the model processing result comprises: position information of each focus object and a confidence coefficient of the position information of each focus object, wherein the position information is used to indicate a position of a corresponding focus object in the original image;
- determining, by the main control unit, movement parameters of a focus motor of the device system according to the model processing result and the phase map, and storing the movement parameters in the storage unit; and
- determining, by the main control unit, control parameters based on the movement parameters, and sending the control parameters to a driver unit of the device system through the protocol communication unit, to enable the driver unit to drive the focus motor to perform focusing.

Compared with the existing technology, the present application has the following beneficial effects: the architecture of the image sensor according to the schemes in the present application is optimized, thereby the steps of the device system's processor receiving an image, calculating a phase value according to phase information in the image, and controlling the focus motor according to the phase value are eliminated. In fact, the above phase information extraction, phase value calculation, and focus motor control functions are all built into the image sensor, thereby the bandwidth consumption of data transmission and the delay of controlling the motor movement during autofocus are both reduced. As a result, the speed of autofocus is improved.

It can be understood that, for the beneficial effects of the second aspect mentioned above, reference may be made to the relevant description in the first aspect mentioned above, which will not be repeated here.

BRIEF DESCRIPTION OF THE DRAWINGS

To illustrate the technical solutions in the embodiments of the present application more clearly, the drawings required for use in the descriptions of the embodiments will be briefly introduced below. Obviously, the drawings described below are only some embodiments of the present application. For ordinary technicians in this field, other drawings may also be obtained based on these drawings without exerting creative efforts.

DETAILED DESCRIPTION OF THE EMBODIMENTS

Figure 1:
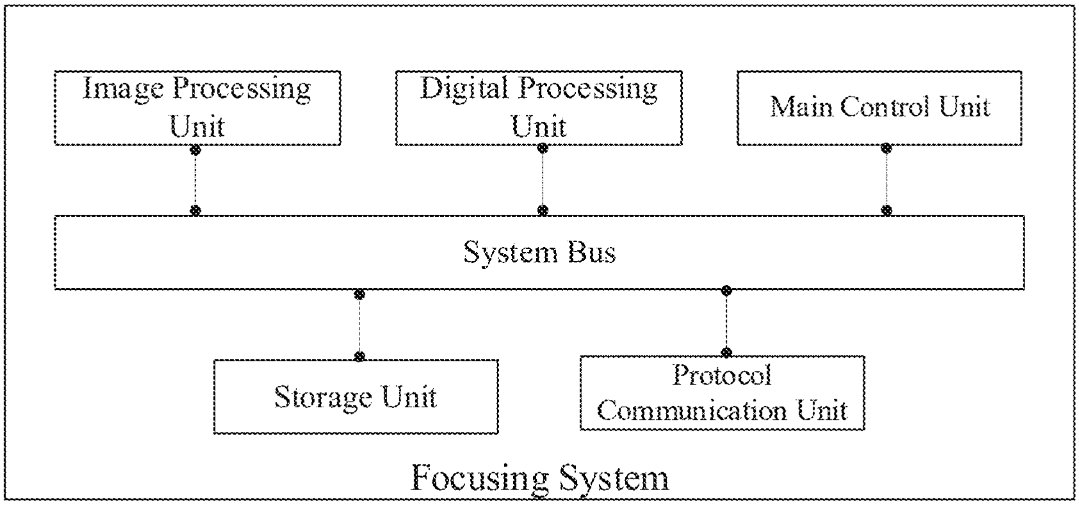
FIG. 1 is a schematic diagram of a possible architecture of a focusing system provided in an embodiment of the present application.

In the following description, for the purpose of illustration rather than limitation, specific details such as specific system structures and technologies are proposed to provide a thorough understanding of the embodiments of the present application. However, it should be clear to a person skilled in the art that the present application may also be implemented in other embodiments without these specific details. In other instances, detailed descriptions of well-known systems, devices, circuits, and methods are omitted to prevent unnecessary details from hindering the description of the present application.

It should be understood that, when in the description of the present application and the appended claims, the term "include" indicates the presence of the described features, wholes, steps, operations, elements, and/or components, but does not exclude the presence or addition of one or more other features, wholes, steps, operations, elements, components, and/or their combinations.

It should also be understood that the term "and/or" in the description of the present application and the appended claims refers to any combination of one or more of the associated listed items and all possible combinations and includes these combinations.

As in the description of the present application and the appended claims, the term "if" may be interpreted as "when . . . " or "once" or "in response to determination" or "in response to detection" according to the context. Similarly, the phrase "if determined" or "if [described condition or event] is detected" may be interpreted as meaning "once determined" or "in response to determination" or "once [described condition or event] is detected" or "in response to detecting [described condition or event]" depending on the context.

In addition, in the description of the present application and the appended claims, the terms "first" and "second" are used only to distinguish the description and cannot be understood as indicating or implying relative importance.

The reference to "one embodiment" or "some embodiments" described in the present application means that the specific features, structures or characteristics described in conjunction with the embodiment may be included in one or more embodiments of the present application. Therefore, the statements "in one embodiment", "in some embodiments", "in some other embodiments", "in yet other embodiments", etc. appearing in different places in the present application do not necessarily refer to the same embodiment, but mean "one or more but not all embodiments", unless otherwise specifically emphasized in other ways. The terms "including", "comprising", "having" and their variations all mean "including but not limited to", unless otherwise specifically emphasized in other ways.

Currently, when shooting, the typical process of autofocus of the device (including but not limited to mobile phones, etc.) usually requires the collaboration of the image sensor, the device's processor and the focus motor to complete, including the following steps: first, an image containing phase information from the image sensor is received by the device's processor; then, the phase information is extracted by the device's processor from the image for calculation, thereby a phase value of an entire image or in a specific region is obtained; finally, the device's processor is configured to calculate a stroke required for the focus motor to move based on the phase value, and then control the focus motor to move until the lens is moved by the focus motor to a clear focus position. In the autofocus process, each step will introduce a delay, and the accumulation of these delays will cause the lens position to no longer meet the latest requirements for focus clarity after the focus motor completes its movement. At this point, the autofocus process needs to be repeatedly executed, resulting in a longer time required to achieve clear focus. Especially when there is a relative motion between the device and the object to be focused, the above autofocus process is likely to be unable to achieve a clear focus result, which seriously affects the shooting quality.

For the above considerations, a focusing system and a focusing method are provided according to the embodiments of the present application, to improve the architecture of the image sensor and to integrate most of the operations required for focusing into the image sensor, so as to improve the speed of autofocus. Herein, the focusing system is applied to the image sensor, and the focusing system may be considered as a camera system having a focusing function. The image sensor is integrated into a device system, and the device system is applied to an electronic device. As an example only, the electronic device includes but is not limited to a device having shooting functions such as a smart phone and a tablet computer, and the specific type of the electronic device is not limited here.

To facilitate the understanding of the focusing system provided in the embodiment of the present application, the focusing system is explained and illustrated by specific embodiments below.

Referring to FIG. 1, which shows a schematic diagram of an architecture of the focusing system provided in an embodiment of the present application. As shown in FIG. 1, the focusing system includes but is not limited to the following units: a main control unit, an image processing unit, a digital processing unit, a storage unit and a protocol communication unit. In this embodiment, the storage unit is configured to pre-store a program code related to a focusing process. It can be understood that, when the program code is executed, each unit can be triggered accordingly to execute the steps described in the following article. Each unit is connected through a system bus to achieve data interaction and control between different units. In the embodiments of the present application, the bus protocol adopted by the system bus is not limited. For example, the system bus may adopt the AXI (Advanced eXtensible Interface) bus protocol or other bus protocols, which will not be described here.

Figure 2:
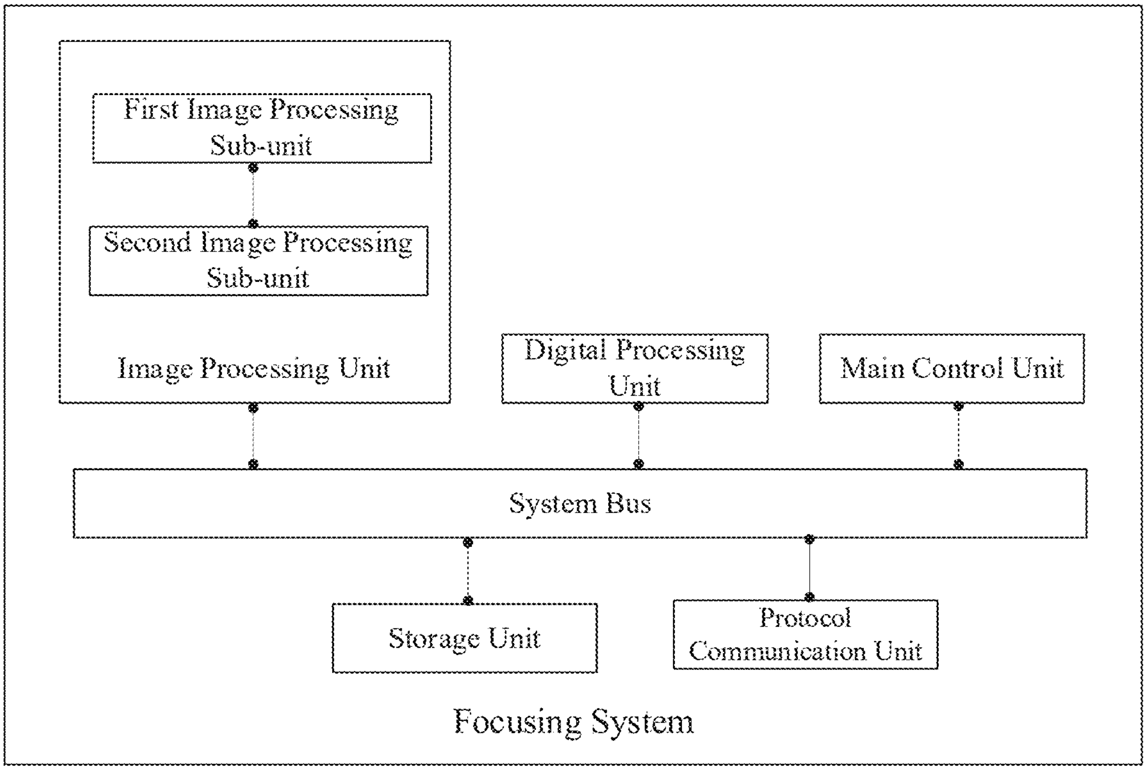
FIG. 2 is a schematic diagram of another possible architecture of the focusing system provided in an embodiment of the present application.

The following introduces and explains the specific functions of each unit and the operations performed thereby in the focusing process:

The image processing unit may perform a series of operations related to basic image processing. To improve the processing efficiency of the image processing unit, referring to FIG. 2, the image processing unit may be divided into a first image processing sub-unit and a second image processing sub-unit. An input of the first image processing sub-unit is an original image obtained by the image sensor, and an input of the second image sub-unit is an output of the first image processing sub-unit, and configuration information of the second image processing sub-unit may be issued by the main control unit. Herein, the configuration information includes but is not limited to: relevant parameter configuration information of downsampling processing, relevant parameter configuration information of data rearrangement processing, and storage location configuration information of processing results.

Exemplarily, the first image processing sub-unit may perform preprocessing and information extraction on the original image obtained by the image sensor. Preprocessing includes but is not limited to bad pixel correction and interpolation processing. For bad pixel correction: the image obtained by the electronic device may be flawed due to the failure or defect of the image sensor which will form bad pixels. These bad pixels may appear as black spots, bright spots or color distortion, etc., affecting the visual effect and subsequent processing. On the basis of this, the image quality of the original image may be improved by the first image processing sub-unit through the bad pixel correction, to minimize the impact of bad pixels on the original image. In some examples, the bad pixel correction may be achieved by neighborhood interpolation, image restoration algorithm or mathematical model fitting, and the specific means of bad pixel correction are not limited here. For interpolation processing, it may generate new pixels, to smooth the original image and avoid distortion, so that the original image can maintain a good visual quality. In some examples, the interpolation processing may be nearest neighbor interpolation, bilinear interpolation, bicubic interpolation or interpolation method based on deep learning, and the specific means of interpolation processing are not limited here. Information extraction, in the embodiment of the present application, refers to the extraction of the phase information of the original image, so that a phase map corresponding to the original image can be obtained. It can be understood that through this phase map, the shape, contour and depth information of each object in the environment can be better understood in the future, thus helping to achieve focusing. Finally, through the first image processing sub-unit, the processed original image and the phase map corresponding to the original image can be obtained. Under the permission of the main control unit, the original image and the phase map can be transmitted by the first image processing sub-unit to the second image processing sub-unit.

Exemplarily, the second image processing sub-unit may further perform processing on the obtained original image, including but not limited to an operation of downsampling processing and data rearrangement data. The reason why the downsampling and data rearrangement processing are not performed on the phase map here is that the resolution of the phase map is usually much lower than that of the original image, so these two processes are unnecessary for the phase map. Herein, the downsampling ratio may be an integer multiple of 2, and the downsampling should be performed at the same ratio in length and width directions to avoid changes in the aspect ratio of the original image. The data rearrangement processing refers to changing the pixel arrangement of the original image after downsampling from the original arrangement according to pixel position to arrangement according to channel. For the convenience of distinction, the image obtained after data rearrangement is recorded as a rearranged image. It can be understood that in the original image before the data rearrangement processing (that is, the original image after downsampling), the pixels in adjacent positions are closely arranged together. In the original image after the data rearrangement processing, the pixels in the same channel are closely arranged together. Finally, through the downsampling processing performed by the second image processing sub-unit, the resolution of the original image can be adjusted to a resolution acceptable to the subsequent artificial intelligence model.

The storage unit is capable of storing data, and the data includes but is not limited to data output by other units in the focusing system and data transmitted from the device system, etc. That is, the storage unit may store data generated within the focusing system and may also store data transmitted from outside the focusing system, which is not limited here. Herein, the storage medium used by the storage unit may be a Static Random-Access Memory (SRAM), a Magneto-resistive Random Access Memory (MRAM) or a Double Data Rate Synchronous Dynamic Random Access Memory (DDR SDRAM), etc., which is not limited here.

Based on this, for the image processing unit, the result obtained after processing (including the phase map and the rearranged image) may be stored as a whole frame in a first designated position in the storage unit through the system bus. Herein, as described above, the first designated position may be determined according to the storage position configuration information received by the image processing unit (i.e., the second image processing sub-unit) from the main control unit. It can be understood that the phase map and the rearranged image belong to the data generated within the focusing system and stored in the storage unit.

In addition, the storage unit may also pre-store an artificial intelligence model. Herein, the artificial intelligence model has a series of artificial intelligence algorithms built in, to detect a specific focus object, and the detection result may be used as a basis for reference for subsequent focusing. The specific focus object may be an object that the user is interested in or expects to identify, such as a person, a pet or other object, etc., which is not limited here.

The digital processing unit may read the artificial intelligence model from the storage unit and execute the corresponding artificial intelligence algorithm based on the artificial intelligence model. Herein, the digital processing unit may be equipped with a digital signal processor (DSP), but it may occupy a large chip area and cause greater energy consumption. Or alternatively, the digital processing unit may also be equipped with a neural network processor (Neural network Processing Unit, NPU), the NPU occupies a smaller chip area and consumes less energy than a digital signal processor. Under the control of the main control unit, the digital processing unit may read the rearranged image from the storage unit and use the rearranged image as the input of the artificial intelligence model, thereby a model reasoning is carried out, the rearranged image is consumed, to obtain a model processing result output by the artificial intelligence model. The model processing result may include the following information: the position information of the detected focus object(s) and the corresponding confidence coefficient, and the position information is used to indicate the position of the corresponding focus object in the original image. The digital processing unit, after obtaining the model processing result, may store the model processing result in the storage unit for subsequent reading and invocation by other modules.

The main control unit, after reading and executing the program code from the storage unit, may control various other units, to trigger each other unit to perform the operations described in the previous and following texts, and realize collaborative work of the various other units. Herein, the main control unit may be equipped with a central processor (Central Processing Unit, CPU) or a customized logic circuit. As an example only, the main control unit may be equipped with a central processing unit for application first, and may be replaced with a customized logic circuit after the application matures to save the occupied chip area and power consumption. In the focusing process, the main control unit may read the model processing result and phase map from the storage unit and calculate movement parameters of the focus motor based on the model processing result and phase map. Then, the main control unit may determine the control parameters through the movement parameters and send the control parameters to a driver unit of the device system through the protocol communication unit. Herein, the driver unit has two functions: the first function is to drive the focus motor to keep the lens in a reasonable focus position, the second function is to perform optical anti-shake functions, so that the device system can provide stable image or video information even in motion. In the embodiments of the present application, the control parameters are mainly used for the above-mentioned first function, that is, to control the driver unit of the device system to drive the focus motor of the device system to perform focusing. Herein, the movement parameters and control parameters may be transmitted by the main control unit through the system bus and stored into the storage unit, which will not be repeated here.

Figure 3:
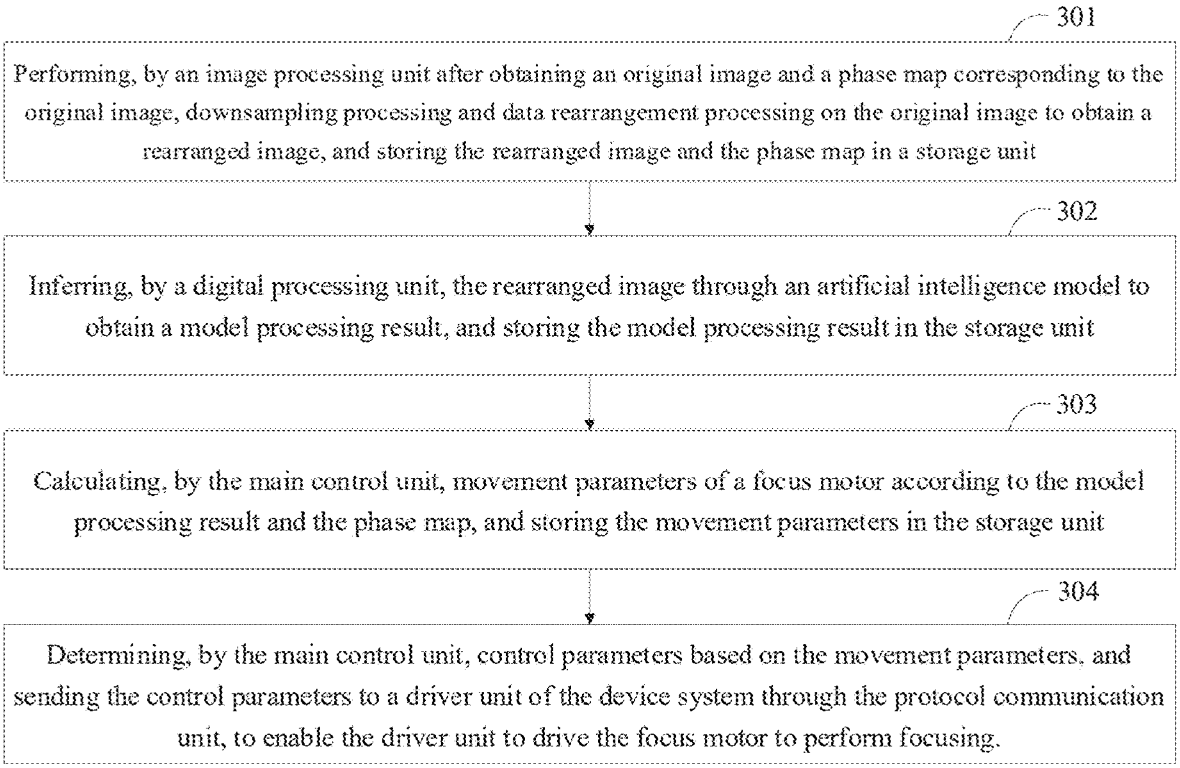
FIG. 3 is a schematic diagram of an implementation flow of a focusing method provided in an embodiment of the present application.

Based on the specific functions of each unit in the focusing system provided above and the operations performed in the focusing process, referring to FIG. 3, which shows a schematic diagram of a focusing method provided in an embodiment of the present application.

In step 301, an image processing unit, after obtaining an original image and a phase map corresponding to the original image, performs downsampling processing and data rearrangement processing on the original image to obtain a rearranged image, and stores the rearranged image and the phase map in a storage unit.

It can be understood that after this step, the program code, artificial intelligence model, rearranged image and phase map are stored in the storage unit.

In step 302, the rearranged image is inferred by a digital processing unit through an artificial intelligence model to obtain a model processing result, and the model processing result is stored in the storage unit.

It can be understood that after this step, the program code, artificial intelligence model, model processing result and phase map (the rearranged image has been consumed) are stored in the storage unit.

In step 303, a main control unit performs calculation based on the model processing result and the phase map to obtain movement parameters of the focus motor and stores the movement parameters in the storage unit.

It can be understood that after this step, the program code, artificial intelligence model, model processing result, phase map and movement parameters are stored in the storage unit.

In step 304, the main control unit determines control parameters based on the movement parameters and sends the control parameters to a driver unit of a device system through a protocol communication unit, to enable the driver unit to drive the focus motor to perform focusing.

It can be understood that after this step, the program code, artificial intelligence model, model processing result, phase map, movement parameters and control parameters are stored in the storage unit.

In some embodiments, the movement parameters may include: a movement direction and a movement distance of the focus motor. On this basis, the operation of performing calculation by the main control unit according to the model processing result and the phase map to obtain the movement parameters of the focus motor may be manifested as follows:

A1, in the model processing result, the position information of various focus objects is screened according to the confidence coefficients.

The position information of various focus objects may be screened by the main control unit according to the confidence coefficients in the obtained model processing result according to the judgment logic preset in the program code. As an example only, the position information may be sorted according to the size of the confidence coefficient, and then N pieces of position information having a confidence coefficient greater than a preset confidence coefficient threshold are selected, or M pieces of position information having the highest confidence coefficient are selected. The specific screening condition is not limited here. Through the above operations, the position information of the focus objects having high confidence coefficients is selected, and the position information of the focus objects having low confidence coefficients are eliminated, that is, the position information is likely to be not corresponded to the correct focus object.

A2, corresponding phase information in the phase map is obtained according to the position information of focus object(s) that has(have) been retained after screening.

Each position information corresponds to a phase map position in the phase map, and the corresponding phase information may be obtained from the phase map position. On this basis, when it is assumed that the position information of L focus objects has been retained after screening, then the main control unit may correspondingly obtain L pieces of phase information in the phase map. It can be understood that L is a positive integer, that is, the main control device may obtain at least one piece of phase information (as at least one focus object may be selected).

A3, a movement direction and a movement distance are calculated according to the position information of the at least one focus object that has been retained and the corresponding phase information.

The main control unit may perform weighted calculation based on the position information of the L focus objects retained and the corresponding phase information, to obtain the movement direction and movement distance required for the focus motor to achieve clear focus. Herein, the weights used in the weighted calculation may be preset according to the user's preferences and needs, which will not be repeated here.

In some embodiments, the main control unit determines the control parameters based on the movement parameters and sends the control parameters to the driver unit of the device system through the protocol communication unit, which may be manifested as follows:

B1, the movement parameters are converted according to register attributes of the driver unit to obtain the control parameters, and the control parameters are stored in the storage unit.

The driver unit usually includes several registers, these registers are used to store control signals and/or status information, etc. That is, the controlling of the driver unit is achieved by writing to the registers of the driver unit. Since each register has its own specific attributes and format, the relevant attributes of the register need to be considered in the conversion process of the control parameters. In the embodiments of the present application, the register attributes of concern include but are not limited to: width, stored data type and operation mode (such as read-write timing), etc. The main control unit may convert the calculated movement parameters into control parameters that meet the register format and drive requirements based on the register attributes. For example, the movement distance may need to be converted into a corresponding voltage value or pulse frequency, and the movement direction may need to be converted into a “forward” or “backward” control signal, etc., which will not be elaborated here.

As described above, after the control parameters are obtained through conversion, the main control unit may store these control parameters in the storage unit. It can be understood that the purpose of storing the control parameters is for subsequent transmission and execution to ensure that the main control unit can send the control parameters to the driver unit at the right time to achieve precise control of the focusing system.

B2, the control parameters are sent to the driver unit through the protocol communication unit.

The main control unit may then send the control parameters stored in the storage unit to the driver unit through the protocol communication unit. It can be understood that the protocol communication unit is responsible for performing data transmission tasks to ensure that the control parameters can be correctly transmitted to the driver unit. The protocol communication unit generally supports standard communication protocols, including but not limited to the Inter-Integrated Circuit (I2C) communication protocol, the Serial Peripheral Interface (SPI) communication protocol, the Universal Asynchronous Receiver Transmitter (UART) communication protocol and the Controller Area Network (CAN) communication protocol, etc., for data transmission.

Once the received control parameters are written into the register of the driver unit of the device system, and the behavior of the focus motor can be adjusted according to these control parameters, triggering the focus motor to perform actual physical movement according to the control parameters to achieve focus.

Figure 4:
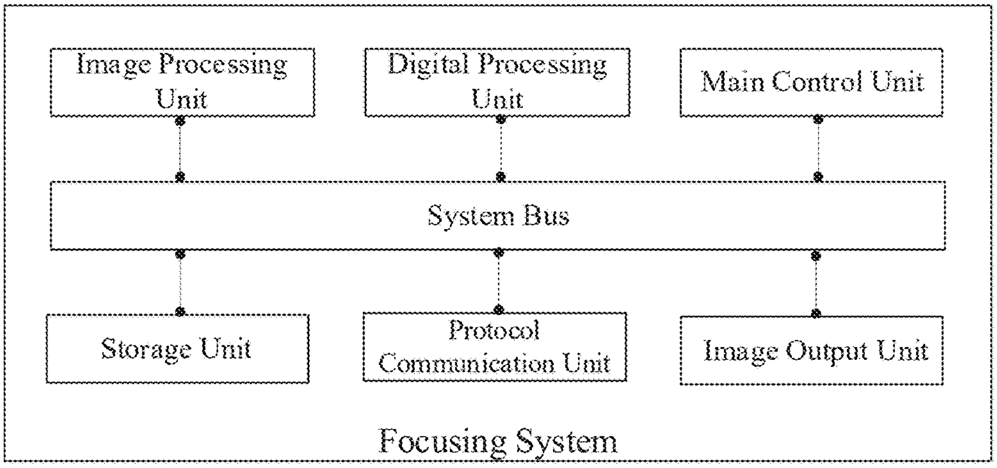
FIG. 4 is a schematic diagram of yet another possible architecture of the focusing system provided in an embodiment of the present application.

In some embodiments, referring to FIG. 4, the focusing system may also include an image output unit, and the image output unit may send data to a processor of the device system. An Image Loader module may be used in the image output unit, which is not limited here.

Based on this, the main control unit may also perform the following operations: obtaining a focus result of the focus motor and storing the focus result in the storage unit. Exemplarily, the main control unit may read the focus result of the focus motor from a specific register of the driver unit. The focus result is used to confirm whether the focus is completed. The specific register may be determined according to a model of the focus motor. The main control unit, after obtaining the focus result, may also store the focus result in the storage unit. In this way, the following data: the program code, the artificial intelligence model, the model processing result, phase map, the movement parameters, the control parameters and the focus result are stored in the storage unit. In this case, the image output unit may send part of the data currently stored in the storage unit to the processor of the device system through a virtual channel. Herein, part of the data may include: the model processing result, the movement parameters, the control parameters and the focus result. The part of the data may also include less or more data, which can be deleted based on user needs without limitations here.

In some embodiments, part of the data (including model processing result, movement parameters, control parameters and focus result) in the storage unit may be sent by the image output unit to the processor of the device system through a virtual channel in the following manner:

C1, the model processing result, the movement parameters, the control parameters and the focus result are rearranged according to a preset rearrangement scheme to obtain a rearrangement result.

The main control unit may control the model processing result, the movement parameters, the control parameters and the focus result to perform data rearrangement in the image output unit. The rearrangement scheme used may be determined according to the specific application scenario, which is not limited here. Through the above processing of rearrangement, the processor of the subsequent device system may be enabled to correctly parse these data.

C2, the rearrangement result is encoded according to a preset signal output protocol to obtain an encoding result.

The rearrangement result may be encoded by the image output unit according to the signal output protocol adopted by the virtual channel between the image output unit and the processor of the device system. As an example only, the signal output protocol may be a Mobile Industry Processor Interface (MIPI) protocol, a Low Voltage Differential Signaling (LVDS) protocol or an SPI protocol, etc., which is not limited here.

C3, the encoding result is sent to the processor through the virtual channel.

As an example only, when the MIPI protocol is adopted for encoding, the image output unit may send the encoding result to the MIPI TX module, so that the encoding result is sent to the processor of the device system through a corresponding virtual channel, to inform the device system of the completion of the current focus task.

It should be noted that, in a tracking mode of a specific focus object, the above-mentioned steps may be repeatedly performed within a certain period (for example, within the transmission time of a frame of image data), so as to realize the function of high-speed focus tracking in this tracking mode.

In some embodiments, the image sensor, after being powered on, may first perform an initialization process to complete a download of necessary data, and the necessary data includes but is not limited to the program code and the artificial intelligence model. As an example only, the initialization process may include steps of: activating the image processing unit, image output unit, storage unit and protocol communication unit of the image sensor immediately upon powering on the image sensor, while other units remain temporarily inactive. Subsequently, the image output unit may send a ready message to the processor of the device system. Herein, the ready message is used to indicate that the image sensor is currently ready. The processor of the device system, after receiving the ready message, may send the program code and artificial intelligence model to the storage unit of the image sensor through the protocol communication unit of the image sensor and store the same in the storage unit, thereby the download of the program code and artificial intelligence model by the image sensor is completed.

It can be understood that after the above initialization process, the main control unit of the image sensor may be activated by the processor of the device system, and the main control unit then triggers other units of the image sensor to be activated, so that the image sensor is enabled to start high-speed focusing based on the processing flow of the focusing system and the corresponding focusing method provided in the above text.

Figure 5:
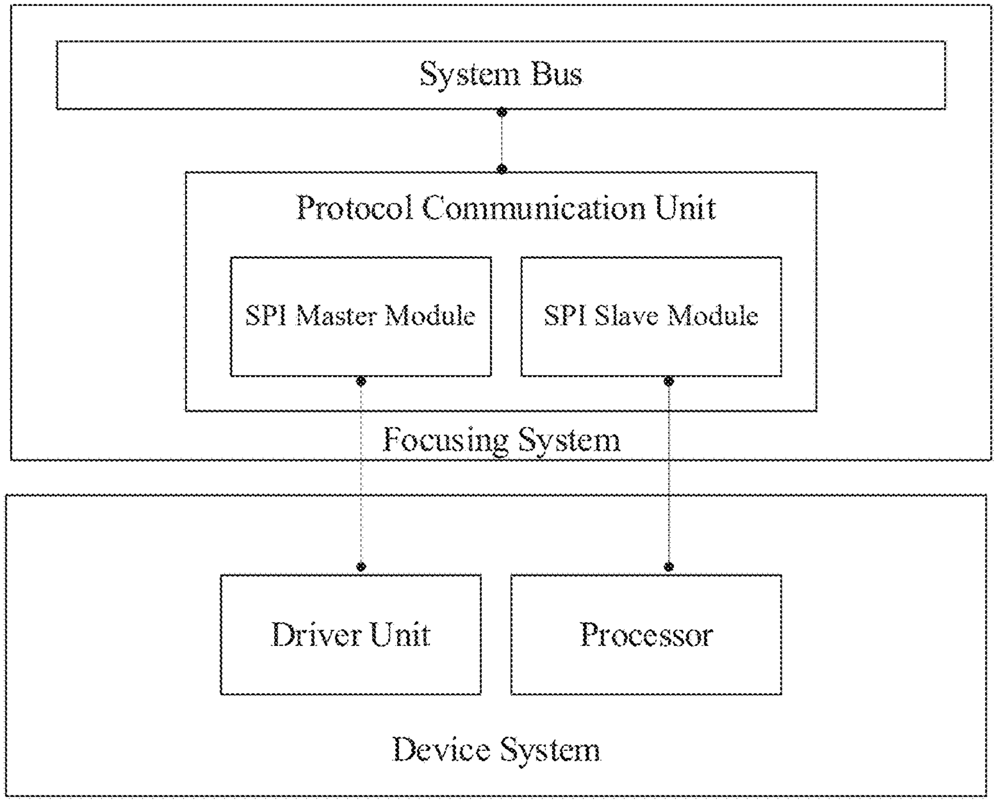
FIG. 5 is a schematic diagram of the communication between the focusing system and the outside provided in an embodiment of the present application.

In some examples, taking the SPI communication protocol adopted by the protocol communication unit as an example, the protocol communication unit is further introduced below:

The protocol communication unit that adopts SPI communication protocol includes an SPI master module and an SPI slave module. Herein, the SPI master module is a master controller for the image sensor to communicate with the outside (such as the device system) using the SPI protocol, and in the embodiments of the present application, the SPI master module is mainly controlled by the image sensor, for example, the SPI master module may be used for the image sensor to control the driver unit of the device system. The SPI slave module is a slave controller for the image sensor to communicate with the outside (such as the device system) using the SPI protocol, and in the embodiments of the present application, the SPI slave module is mainly subjected to external control. Referring to FIG. 5, which shows a schematic diagram of the image sensor interacting with the device system through the protocol communication unit. It should be noted that to save space, other units except the protocol communication unit are not shown in FIG. 5. As shown in FIG. 5, for the SPI master module, the focusing system (i.e., the image sensor) may transmit the control parameters to the driver unit of the device system through the SPI master module and read the focus result on the specific register of the driver unit. As for the SPI slave module, the processor of the device system may transmit the program code and artificial intelligence module to the focusing system (i.e., the image sensor) through the SPI slave module.

In summary, the architecture of the image sensor is optimized according to the embodiments of the present application, thus the steps of the device system' processor receiving the image, calculating the phase value according to the phase information in the image, and controlling the focus motor according to the phase value are eliminated. In fact, the above phase information extraction, the phase value calculation, and the control functions of the focus motor are all built into the image sensor, thereby the bandwidth consumption of data transmission is reduced and the delay of controlling the movement of the motor during autofocus is also reduced. Thus, the speed of autofocus is improved.

In some embodiments, to deal with the tracking and focusing problem of a specific object in relative motion, the various units in the focusing system as discussed above, such as the image processing unit, the digital processing unit, and the main control unit, may further include the following functions:

The image processing unit may be configured to preprocess the original image obtained though collection to obtain a processed image, and store the processed image in the storage unit. It can be understood that in the embodiments of the present application, the storage unit is still used for storage, and the processed image is one of the data generated within the focusing system stored in the storage unit.

Exemplarily, the image processing unit may process the original image after the original image is collected by the image sensor, to ensure that the original image meets the requirements of subsequent target tracking and focusing. For the convenience of distinction, the image data obtained after preprocessing the original image is recorded as a processed image in the embodiments of the present application. The processed image may be stored in the storage unit, making it convenient for other units to quickly access and use the processed image when performing focus-related operations in subsequent operations.

The digital processing unit may be configured to determine a region of interest containing the focus object in the processed image according to a stage where the target tracking task lies.

Exemplarily, the digital processing unit may search for a region of interest from the processed image, and the region of interest refers to a region containing the focus object, and the focus object is a target that the device system expects to continuously track. According to different stages where the target tracking task lies, the digital processing unit may determine the region of interest in different ways; in the embodiments of the present application, the stages may include an initialization stage and a task execution stage. It can be understood that when the image sensor is not currently performing a target tracking task, the image sensor may enter the initialization phase of the target tracking task; when the image sensor is currently performing a target tracking task, it can be determined that the image sensor is currently in the task execution phase of the target tracking task.

In the case that the task lies in the initialization stage, the current frame would necessarily be a first frame, so the digital processing unit may determine the region of interest containing the focus object in the processed image of the current frame according to a target tracking strategy that has been configured.

In the case that the task does not lie in the initialization stage (that is, the task lies in the task execution stage), the current frame is not the first frame, that is, there must be a processed image of a previous frame, so the digital processing unit may determine a search region in the processed image of the current frame according to the region of interest of the processed image of the previous frame, and determine a region of interest containing the focus object within the search region.

The main control unit may be configured to control the focus motor of the device system through the region of interest.

Exemplarily, the main control unit may determine whether a focal length of the lens needs to be adjusted according to the image clarity, edge features or other indicators (such as contrast or phase detection) of the determined region of interest, to control the focus motor of the device system to achieve clear focus on the focus object.

In one application scenario, the focus motor of the device system may be directly controlled by the image sensor, and this step may be performed as follows: the main control unit determines motor movement parameters through the phase information of the region of interest (which may be quantified by a quantization circuit of the image sensor, which will not be described here) in combination with a preset linear calculation formula, and sends the motor movement parameters to the driver unit of the device system, to control the focus motor of the device system to move to achieve focus. It should be noted that when the focus motor of the device system is directly controlled by the image sensor, a unique region of interest should be determined.

In another application scenario, the focus motor of the device system may also be indirectly controlled by the image sensor, and this step may be performed as follows: the main control unit sends the position information of the region of interest and the corresponding phase information to the processor of the device system. The processor calculates the motor movement parameters based on the position information of the region of interest, the corresponding phase information and the preset linear calculation formula and sends the motor movement parameters to the driver unit of the device system, to control the focus motor of the device system to move to achieve focus. It should be noted that when the focus motor of the device system is indirectly controlled by the image sensor, the number of determined regions of interest is not limited here, that is, the number of regions of interest may be more than one. In the case that more than two regions of interest are included, the processor of the device system may first determine which region of interest is the focus object to be tracked among the two or more regions of interest, and then perform the subsequent calculation of the motor movement parameters.

In this embodiment of the present application, it is mainly focused on the case where the focus motor of the device system is directly controlled by the image sensor. That is, how the image sensor determines a unique region of interest will be described in detail below.

Figure 6:
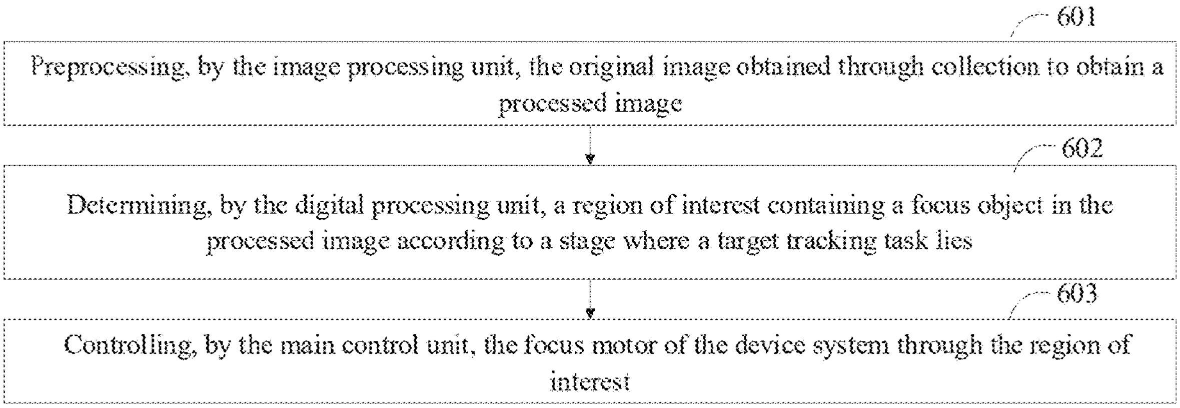
FIG. 6 is a schematic diagram of an implementation flow of another focusing method provided in an embodiment of the present application.

Based on the specific functions of each unit in the focusing system provided above and the operations performed in the focusing process, another focusing method is provided according to an embodiment of the present application, referring to FIG. 6, which shows a schematic diagram of the focusing method provided by an embodiment of the present application.

In step 601, the original image obtained through collection is preprocessed by the image processing unit to obtain a processed image, and the processed image is stored in the storage unit.

In step 602, a region of interest containing a focus object in the processed image is determined by the digital processing unit according to a stage where the target tracking task lies.

In step 603, the focus motor of the device system is controlled by the main control unit through the region of interest.

In some embodiments, the preprocessing may include two main steps of quantization and scaling. Based on this, the image processing unit preprocesses the original image obtained through collection to obtain the processed image, which may be manifested as follows:

D1, the original image is quantified to obtain a quantized image.

Through the quantization processing, the original image may be converted by the image processing unit from an analog signal to a digital signal, to obtain the quantized image. Compared with the original image, the amount of data of the quantized image has been reduced to a certain extent, which can improve the speed and efficiency of subsequent image processing.

It should be noted that the image processing unit, after obtaining the quantized image, will process the quantized image in the following two aspects: on the one hand, directly output the quantized image to the processor of the device system through the MIPI TX module; on the other hand, further obtain the processed image through step D2 or D3 and store the processed image in the storage unit of the image sensor.

D2, the quantized image is determined as the processed image in case that a resolution of the quantized image meets a preset resolution requirement.

In the process of outputting the quantized image to the storage unit for storage, considering the computing power of the image sensor, in order to meet the needs of subsequent focus control, the image processing unit may preset a resolution requirement and process the quantized image based on the resolution requirement. Herein, the resolution requirement may be a given resolution. As an example only, the length and width of the given resolution may be the same, and the resolution should not be too large; that is, the quantized image that meets the resolution requirement may be: a square image of a small resolution.

It can be understood that when the resolution of the quantized image meets the resolution requirement, the image processing unit may not perform a scaling process on the quantized image, and the quantized image may be directly determined as a processed image and stored in the storage unit of the image sensor.

D3, the quantized image is scaled in case that the resolution of the quantized image does not meet the preset resolution requirement, and the scaled quantized image is determined as a processed image, where the scaled quantized image meets the resolution requirement.

It can be understood that when the resolution of the quantized image does not meet the resolution requirement, it is necessary for the image processing unit to scale the quantized image so that the scaled quantized image can meet the resolution requirement. The scaled quantized image may be determined as the processed image and stored in the storage unit of the image sensor.

In some embodiments, for the initialization stage, two possible target tracking strategies are provided, namely: a sending strategy and a detection strategy. Exemplarily, the sending strategy is that the image sensor passively determines the region of interest based on the data sent by the processor of the device system. The detection strategy is that the image sensor autonomously determines the region of interest through a target detection algorithm. Based on this, when the stage where the image sensor's task lies is the initialization stage, the digital processing unit may determine the region of interest in different ways according to different target tracking strategies, as detailed below:

In the case that the target tracking strategy is the sending strategy, the digital processing unit may receive region indication information sent by the processor of the device system and determine the region of interest in the processed image according to the region indication information.

In this case, after the image sensor enters the initialization stage, the processor of the device system may actively send the region indication information to the image sensor. Or alternatively, an information acquisition instruction may also be sent by the image sensor to the processor of the device system, thereby the processor of the device system is triggered to send the region indication information to the image sensor, which will not be limited here. The region indication information may be coordinate information, to indicate the relevant coordinates of the region of interest expected by the processor of the device system (including but not limited to the center point coordinates and vertex coordinates, etc.), and the region of interest expected by the processor of the device system is usually only one. Based on this, the digital processing unit may find a corresponding coordinate region in the processed image according to the region indication information, and the coordinate region is the determined region of interest.

In the case that the target tracking strategy is the detection strategy, the digital processing unit may determine at least one candidate region in the processed image through the target detection algorithm and determine the region of interest in at least one candidate region.

In this case, after the image sensor enters the initialization stage, the digital processing unit may autonomously execute the target detection algorithm with regard to the processed image, to determine at least one detection box in the processed image, and an area defined by each detection box is a candidate region (that is, the candidate region is actually equivalent to the detection box). The digital processing unit may determine which candidate region the initial focus object is in based on the saliency or other characteristics of each candidate region, so as to determine a final region of interest.

It should be noted that when the image sensor indirectly controls the focus motor of the device system, since the image sensor is allowed to transmit information of multiple regions of interest to the processor of the device system, all candidate regions determined by the digital processing unit through the target detection algorithm may be directly determined as regions of interest. That is, in this case, it is not necessary for the digital processing unit to determine the final region of interest based on the saliency or other characteristics of each candidate region, which can save the computing power and power consumption of the image sensor.

In some embodiments, when the target tracking strategy adopted is the detection strategy, and more than two candidate regions are determined by the target detection algorithm in the processed image, in order to ensure that the only region of interest finally determined can truly contain the focus object, the digital processing unit may determine the region of interest in the following manner:

E1, an intersection-and-union ratio between any two candidate regions is determined.

It can be understood that the larger the intersection-and-union ratio between the regions (the closer to 1), the more overlapping parts of the two regions. Conversely, the smaller the intersection-and-union ratio between the regions (the closer to 0), the less overlapping parts of the two regions.

E2, two candidate regions whose intersection-and-union ratio is greater than a preset intersection-and-union ratio threshold are merged into a new candidate region.

In the embodiments of the present application, an intersection-and-union ratio threshold may be set in advance. When the intersection-and-union ratio between the two candidate regions is greater than the intersection-and-union ratio threshold, it is considered that the two candidate regions actually have more duplications and can be merged into a new candidate region, thereby the redundant or repeated candidate regions can be removed.

As an example only, a non-maximum suppression method may be adopted by the digital processing unit to achieve the merging of candidate regions, which will not be elaborated here.

E3, a candidate region having a largest area is determined as the region of interest after the merging is completed.

The digital processing unit may calculate an area of each candidate region retained after the merging is completed and determine the candidate region having the largest area as the final region of interest, so that the number of regions of interest obtained is only one.

Figure 7:
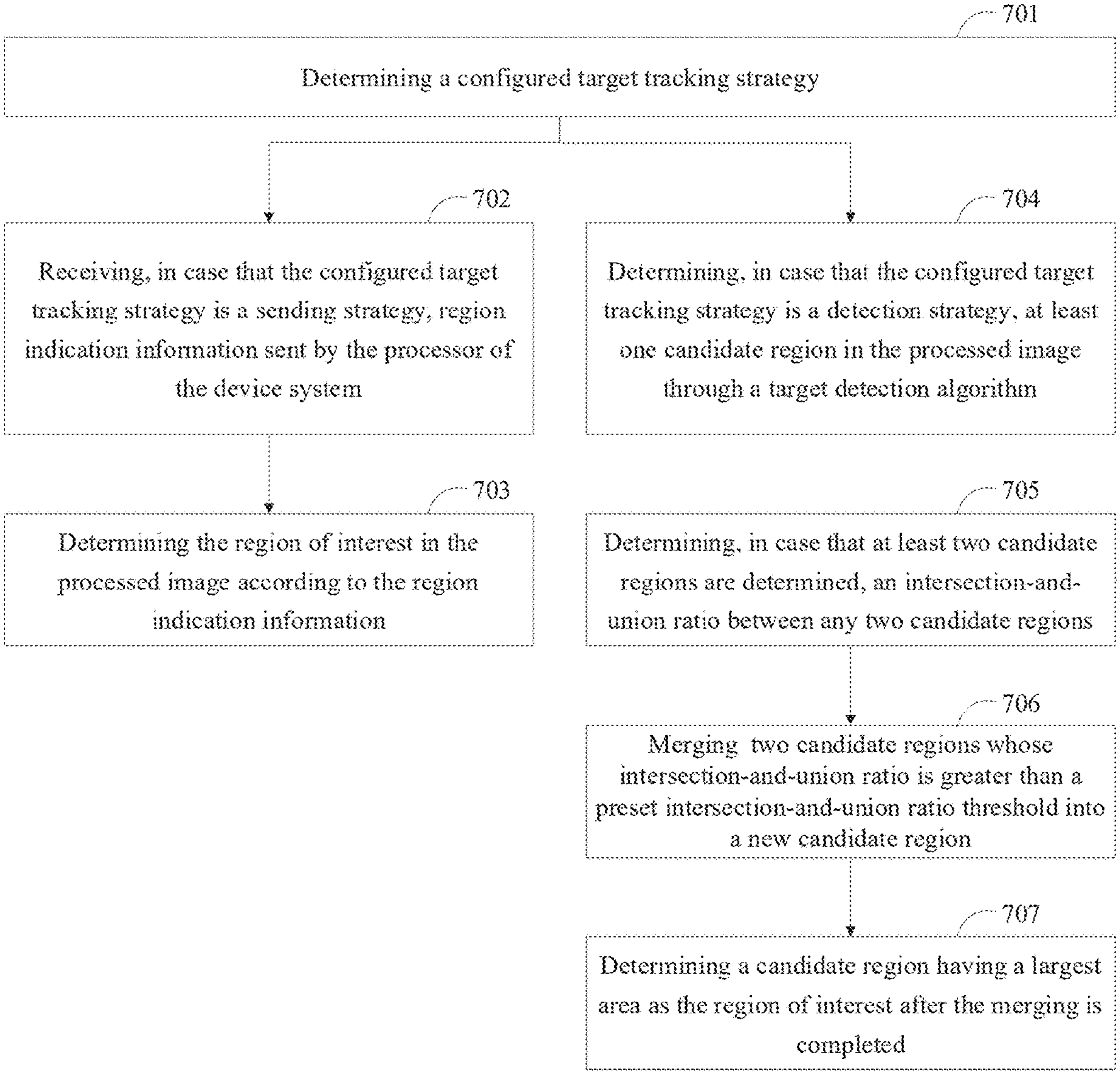
FIG. 7 is a schematic flowchart of a digital processing unit determining a region of interest when a target tracking task lies in an initialization stage provided in an embodiment of the present application.

In conjunction with the above, referring to FIG. 7, a complete flowchart of the digital processing unit determining the region of interest when the target tracking task lies in the initialization stage is shown, which is briefly described as follows:

In step 701, a configured target tracking strategy is determined.

In step 702, region indication information sent by the processor of the device system is received in case that the configured target tracking strategy is a sending strategy.

In step 703, the region of interest in the processed image is determined according to the region indication information.

In step 704, at least one candidate region in the processed image is determined through a target detection algorithm in case that the configured target tracking strategy is a detection strategy.

In step 705, an intersection-and-union ratio between any two candidate regions is determined in case that at least two candidate regions are determined.

In step 706, two candidate regions whose intersection-and-union ratio is greater than a preset intersection-and-union ratio threshold are merged into a new candidate region.

In step 707, a candidate region having a largest area is determined as the region of interest after the merging is completed.

Figure 8:
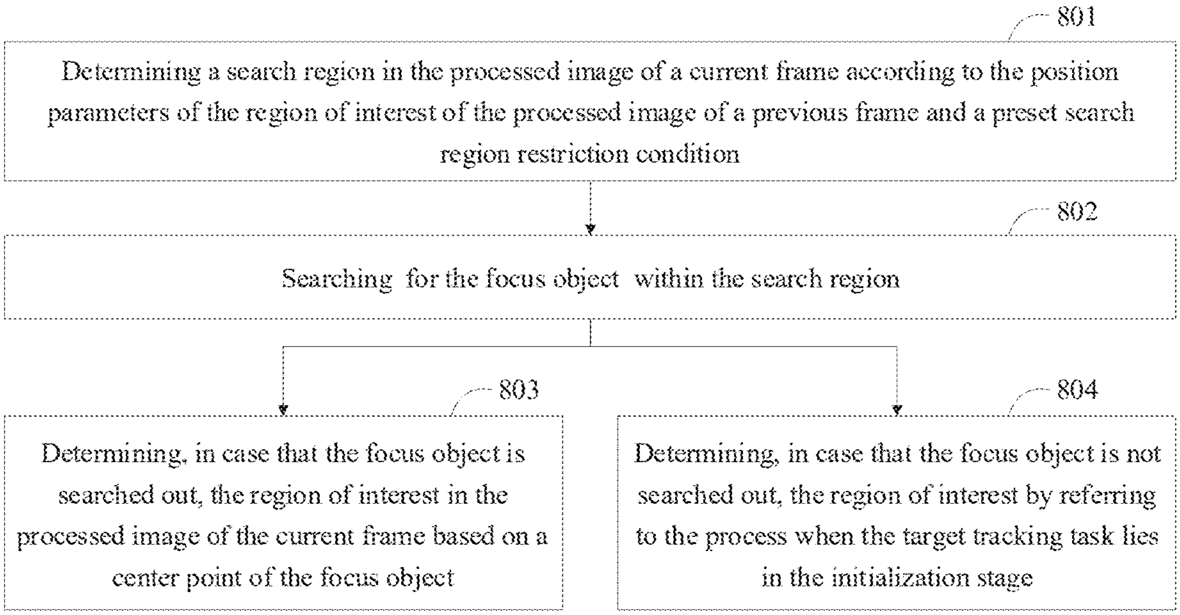
FIG. 8 is a schematic flowchart of the digital processing unit determining the region of interest when the target tracking task lies in a task execution stage provided in an embodiment of the present application.

In some embodiments, when the task lies in the task execution stage, even if a relative motion has occurred between the focus object and the device, the position of the focus object in the image will not produce a sudden shift. Based on this, when the image sensor's task lies is the task execution stage, the digital processing unit may use the region of interest of the processed image of the previous frame as a basis to determine the search region of the processed image of the current frame and determine the region of interest containing the focus object within the search region. Referring to FIG. 8, which shows a complete flowchart of the digital processing unit determining the region of interest when the target tracking task lies in the task execution stage (that is, the target tracking task does not lie in the initialization stage), as detailed below:

In step 801, a search region in the processed image of a current frame is determined according to the position parameters of the region of interest of the processed image of a previous frame and a preset search region restriction condition.

It can be understood that since the focus object will not produce teleportation, even if the relative movement has occurred between the focus object and the device, the position of the focus object in the two adjacent frames will not produce a very obvious difference. Based on this, the digital processing unit may use the region of interest of the processed image of the previous frame as a basis to determine the search region of the processed image of the current frame. Since the processed image of the previous frame and the processed image of the current frame are aligned, the digital processing unit can find a search region that can completely include the region of interest through the position parameters of the region of interest and the preset search region restriction condition.

As an example only, the position parameters of the region of interest of the processed image of the previous frame may include: center point coordinates $(x_{prev}, y_{prev})$, a length $W_{prev}$ and a width $H_{prev}$. The search region restriction condition may include: a search scale coefficient of the search region relative to the region of interest of the processed image of the previous frame, an upper limit $W_{max}$ of a length of the search region and an upper limit $H_{max}$ of a width of the search region.

Then, based on the above parameters, the length $W_{search}$ and width $H_{search}$ of the search region may be respectively expressed as follows:

$$W_{search} = \min(W_{prev} \times \text{scale}, W_{max}); \text{ and}$$

$$H_{search} = \min(H_{prev} \times \text{scale}, H_{max}).$$

The coordinates ($x_{search}$, $y_{search}$) of an upper left corner vertex of the search region are respectively expressed as follows:

$$x_{search} = x_{prev} - \frac{W_{search}}{2}; \text{ and}$$

$$y_{search} = y_{prev} - \frac{H_{search}}{2}.$$

Based on the length $W_{search}$, width $H_{search}$ of the search region and the coordinates ($x_{search}$, $y_{search}$) of the upper left corner vertex, the search region can be obtained.

In step 802, the focus object is searched for within the search region.

To improve the search efficiency, the digital processing unit may search for the focus object only within the search region, without searching for the focus object globally in the processed image of the current frame, thereby the computing resources can be saved. In some examples, the digital processing unit may apply a target tracking algorithm to the search region, and the target tracking algorithm may be a template matching algorithm, a feature point tracking algorithm, or a tracking algorithm based on a deep learning model, which is not limited here.

In step 803, the region of interest in the processed image of the current frame is determined based on a center point of the focus object in case that the focus object is searched out.

Once the focus object is searched out in the current search region, a center point of the search target may be used as a center point of a new region of interest, so that the region of interest is determined in the processed image of the current frame, and the region of interest is updated. Thus, the focus object can be updated frame by frame, to maintain continuity and ensure accuracy during the target tracking process.

In some embodiments, to further save power consumption, the digital processing unit may also only pass the relevant position information of the updated region of interest to the quantization circuit, so that the quantization circuit only quantizes the phase map of the region of interest. That is, the complete processed image of the current frame is no longer quantized to obtain the phase map of the current frame, but only the phase map of the region of interest needs to be quantized for subsequent focus-related calculations.

In step 804, the region of interest is determined by referring to the process when the target tracking task lies in the initialization stage in case that the focus object is not searched out.

When the relative motion amplitude between the device and the focus object is large in a short period of time, it may also be impossible to search for the focus object in the current search region. In this case, references may be made to the process when the target tracking task lies in the initialization stage (such as steps 701 to 707) provided in the previous text, and the region of interest is determined again by the digital processing unit in the complete processed image of the current frame, which will not be repeated here.

In some embodiments, to allow users to check a real-time focus situation on a display screen of the device, even when the image sensor directly controls the focus motor of the device system, the image sensor may still send the obtained position information of the only one region of interest to the processor of the device system in real time, so that the display screen of the device can synchronously display the detection box corresponding to the region of interest of the focus object when displaying the image.

In summary, in the embodiments of the present application, the target tracking task is no longer performed by the processor of the device itself to achieve focus, but the image sensor performs the target tracking task in the current frame and controls the focus motor of the device system according to the tracking result, so as to achieve focus. In the above process, the data transmission operation between the image sensor and the processor of the device system is greatly saved, and excessive delay is avoided, which can reduce the time consumption of focusing and improve the speed of focusing.

It can be clearly understood by a person skilled in the relevant field that, for the convenience and simplicity of description, only the division of the above-mentioned functional units and modules is used as an example. In practical applications, the above-mentioned functions may be assigned to different functional units and modules based on actual needs, that is, the internal structure of the system may be divided into different functional units or modules to complete all or part of the functions described above. The functional units and modules in the embodiment may be integrated into a processing unit, or each unit may physically exist separately, or two or more units may be integrated into one unit. The above-mentioned integrated unit may be implemented in the form of hardware or in the form of software functional units. In addition, the specific names of the functional units and modules are only for the convenience of distinguishing each other and are not used to limit the scope of protection of the present application.

It can be appreciated by a person of ordinary skill in the art that the units and algorithm steps of each example described in the embodiments disclosed herein may be implemented in electronic hardware or in a combination of computer software and electronic hardware. Whether these functions are performed in hardware or software depends on the specific application and design constraints of the technical solution. Professional technicians may use different methods to implement the functions described for each specific application, but such implementations should not be considered to be beyond the scope of the present application.

In the embodiments provided in the present application, it should be understood that the disclosed system and method may be implemented in other ways. The embodiments described above are only schematic. For example, the division of modules or units is only a logical function division. There may be other division methods in actual implementation, such as multiple units or components may be combined or integrated into another system, or some features may be ignored or not executed. Another point is that the mutual coupling or direct coupling or communication connection shown or discussed may be indirect coupling or communication connection through some interfaces, devices or units, which may be electrical, mechanical or other forms.

The unit described as a separate component may or may not be physically separated, and the component displayed as a unit may or may not be a physical unit, that is, it may be located in one place, or it may be distributed on multiple network units. Some or all of the units may be selected according to actual needs to achieve the purpose of the scheme of this embodiment.

The above embodiments are only used to illustrate the technical solution of the present application and are not intended to limit the present application. Although the present application is described in detail with reference to the above embodiments, a person skilled in the art should understand that the technical solution described in the above embodiments may still be modified, or some of the technical features thereof may be replaced by equivalents. These modifications or replacements do not deviate the essence of the corresponding technical solution from the spirit and scope of the technical solution of each embodiment of the present application, which thus should all be included within the protection scope of the present application.

What is claimed is:

1. A focusing system, the focusing system being applied to an image sensor, and the image sensor being integrated into a device system; and the focusing system comprising: a main control unit, an image processing unit, a digital processing unit, a storage unit and a protocol communication unit;

wherein the image processing unit, after obtaining an original image and a phase map corresponding to the original image, is configured to perform downsampling processing and data rearrangement processing on the original image to obtain a rearranged image, and store the rearranged image and the phase map in the storage unit;

the digital processing unit is configured to infer the rearranged image through an artificial intelligence model to obtain a model processing result, and store the model processing result in the storage unit, wherein the artificial intelligence model is stored in the storage unit after the focusing system is initialized, and the model processing result comprises: position information of each focus object and a confidence coefficient of the position information of each focus object, and the position information is used to indicate a position of a corresponding focus object in the original image;

the main control unit is configured to determine movement parameters of a focus motor of the device system according to the model processing result and the phase map, and store the movement parameters in the storage unit; and the main control unit is further configured to determine control parameters based on the movement parameters, and send the control parameters to a driver unit of the device system through the protocol communication unit, to enable the driver unit to drive the focus motor to perform focusing.

2. The focusing system according to claim 1, wherein the movement parameters comprise: a movement direction and a movement distance of the focus motor; and wherein the main control unit, when determining the movement parameters of the focus motor according to the model processing result and the phase map, is further configured to:

screen the position information of each focus object according to the confidence coefficient of the position information of each focus object in the model processing result;

obtain corresponding phase information in the phase map according to the position information of at least one focus object that has been retained after screening; and determine the movement direction and the movement distance according to the position information of the at least one focus object that has been retained and the corresponding phase information.

3. The focusing system according to claim 1, wherein the main control unit, when determining the control parameters based on the movement parameters and sending the control parameters to the driver unit of the device system through the protocol communication unit, is further configured to:

convert the movement parameters according to register attributes of the driver unit to obtain the control parameters, and store the control parameters in the storage unit; and send the control parameters to the driver unit through the protocol communication unit.

4. The focusing system according to claim 3, wherein the protocol communication unit adopts a serial peripheral interface (SPI) communication protocol; and the control parameters being sent to the driver unit through the protocol communication unit comprises that the control parameters are sent to the driver unit through an SPI master module in the SPI communication protocol.

5. The focusing system according to claim 3, wherein the focusing system further comprises: an image output unit;

the main control unit is further configured to obtain a focus result of the focus motor and store the focus result in the storage unit; and the image output unit is configured to send the model processing result, the movement parameters, the control parameters and the focus result to a processor of the device system through a virtual channel.

6. The focusing system according to claim 5, wherein the protocol communication unit adopts a serial peripheral interface (SPI) communication protocol; and the main control unit, when obtaining the focus result of the focus motor, is further configured to:

obtain the focus result from a target register of the driver unit through a SPI master module in the SPI communication protocol, wherein the target register is determined according to a model of the focus motor.

7. The focusing system according to claim 5, wherein the image output unit, when sending the model processing result, the movement parameters, the control parameters and the focus result to the processor of the device system through the virtual channel, is further configured to:

rearrange the model processing result, the movement parameters, the control parameters and the focus result according to a preset rearrangement scheme to obtain a rearrangement result;

encode the rearrangement result according to a preset signal output protocol to obtain an encoding result; and send the encoding result to the processor through the virtual channel.

8. The focusing system according to claim 5, wherein the image output unit is further configured to send a ready message to the processor after the focusing system is powered on, and the ready message is used to indicate that the focusing system is ready; and the storage unit is configured to receive the artificial intelligence model sent by the processor through the protocol communication unit and store the artificial intelligence model.

9. The focusing system according to claim 8, wherein the protocol communication unit adopts a serial peripheral interface (SPI) communication protocol; and the storage unit is further configured to receive the artificial intelligence model sent by the processor through an SPI slave module in the SPI communication protocol and store the artificial intelligence model.

10. The focusing system according to claim 1, wherein the image processing unit is further configured to pre-process the original image obtained through collection to obtain a processed image, and store the processed image in the storage unit;

the digital processing unit is further configured to determine a region of interest containing a focus object in the processed image according to a stage where a target tracking task lies; and the main control unit is further configured to control the focus motor of the device system through the region of interest.

11. The focusing system according to claim 10, wherein the digital processing unit, when determining the region of interest containing the focus object in the processed image according to the stage where the target tracking task lies, is further configured to:

determine, in case that the target tracking task lies in an initialization stage the region of interest containing the focus object in the processed image according to a configured target tracking strategy; and determine, in case that the target tracking task does not lie in the initialization stage, a search region according to the region of interest of the processed image of a previous frame, and determine the region of interest containing the focus object within the search region.

12. The focusing system according to claim 11, wherein the region of interest containing the focus object in the processed image being determined according to the configured target tracking strategy comprises that:

in case that the configured target tracking strategy is a sending strategy, a region indication information sent by a processor of the device system is received, and the region of interest in the processed image is determined according to the region indication information; and in case that the configured target tracking strategy is a detection strategy, at least one candidate region in the processed image is determined through a target detection algorithm, and the region of interest is determined from the at least one candidate region.

13. The focusing system according to claim 12, wherein the region of interest being determined from the at least one candidate region comprises that:

in case that at least two candidate regions are determined, an intersection-and-union ratio between any two of the at least two candidate regions is determined;

two candidate regions whose intersection-and-union ratio is greater than a preset intersection-and-union ratio threshold are merged into a new candidate region; and after merging, a candidate region having a largest area is determined as the region of interest.

14. The focusing system according to claim 11, wherein the region of interest containing the focus object being determined within the search region after the search region being determined according to the region of interest of the processed image of the previous frame, comprises that:

the search region is determined in the processed image of a current frame according to the position parameters of the region of interest of the processed image of the previous frame and a preset search region restriction condition;

the focus object is searched for within the search region; and the region of interest in the processed image of the current frame is determined based on a center point of the focus object in case that the focus object is searched out.

15. The focusing system according to claim 14, wherein the position parameters of the region of interest of the processed image of the previous frame comprise: center point coordinates, a length and a width; the preset search region restriction condition comprises: a search scale coefficient of the search region relative to the region of interest of the processed image of the previous frame, an upper limit on a length of the search region and an upper limit on a width of the search region.

16. The focusing system according to claim 10, wherein the image processing unit, when pre-processing the original image obtained through collection to obtain the processed image, is further configured to:

perform quantization processing on the original image to obtain a quantized image;

determine the quantized image as the processed image in case that a resolution of the quantized image meets a preset resolution requirement; and perform scaling processing on the quantized image, in case that the resolution of the quantized image does not meet the preset resolution requirement, and determine a scaled quantized image as the processed image, wherein the scaled quantized image meets the preset resolution requirement.

17. A focusing method, wherein the focusing method is applied to an image sensor, the image sensor is integrated into a device system; a focusing system is deployed in the image sensor, and the focusing system comprises: a main control unit, an image processing unit, a digital processing unit, a storage unit and a protocol communication unit; and the focusing method comprises:

performing by the image processing unit after obtaining an original image and a phase map corresponding to the original image, downsampling processing and data rearrangement processing on the original image to obtain a rearranged image, and storing the rearranged image and the phase map in the storage unit;

inferring, by the digital processing unit, the rearranged image through an artificial intelligence model to obtain a model processing result, and storing the model processing result in the storage unit, wherein the artificial intelligence model is stored in the storage unit after the focusing system is initialized, and the model processing result comprises: position information of each focus object and a confidence coefficient of the position information of each focus object, wherein the position information is used to indicate a position of a corresponding focus object in the original image;

determining, by the main control unit, movement parameters of a focus motor of the device system according to the model processing result and the phase map, and storing the movement parameters in the storage unit; and determining, by the main control unit, control parameters based on the movement parameters, and sending the control parameters to a driver unit of the device system through the protocol communication unit, to enable the driver unit to drive the focus motor to perform focusing.

18. The focusing method according to claim 17, wherein the movement parameters comprise: a movement direction and a movement distance of the focus motor; and said determining, by the main control unit, the movement parameters of the focus motor of the device system according to the model processing result and the phase map comprises:

screening the position information of each focus object according to the confidence coefficient of the position information of each focus object in the model processing result;

obtaining corresponding phase information in the phase map according to the position information of at least one focus object that has been retained after screening; and determining the movement direction and the movement distance according to the position information of the at least one focus object that has been retained and the corresponding phase information.

19. The focusing method according to claim 17, wherein said determining, by the main control unit, the control parameters based on the movement parameters, and sending the control parameters to the driver unit of the device system through the protocol communication unit comprises:

converting the movement parameters according to register attributes of the driver unit to obtain the control parameters, and store the control parameters in the storage unit; and sending the control parameters to the driver unit through the protocol communication unit.

20. The focusing method according to claim 19, wherein the protocol communication unit adopts a serial peripheral interface (SPI) communication protocol; and said sending the control parameters to the driver unit through the protocol communication unit comprises:

sending the control parameters to the driver unit through an SPI master module in the SPI communication protocol.

* * * * *